Nov. 30, 1965  A. L. TRAFFORD  3,220,536
REINFORCED FIBERGLASS CONVEYOR BUCKET
Filed Oct. 17, 1962  2 Sheets-Sheet 1

INVENTOR:
ARTHUR L. TRAFFORD
BY
ATT'Y

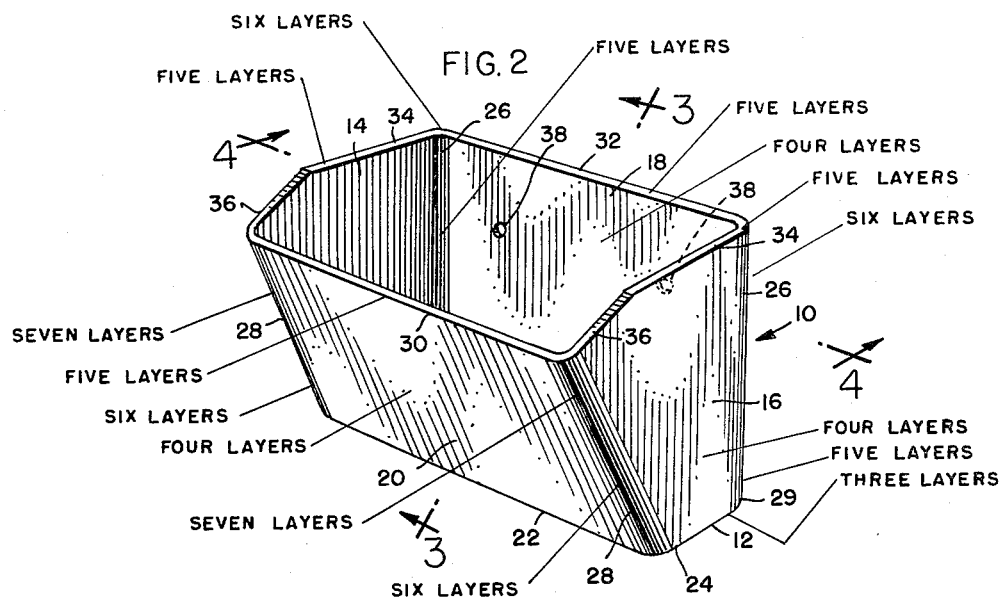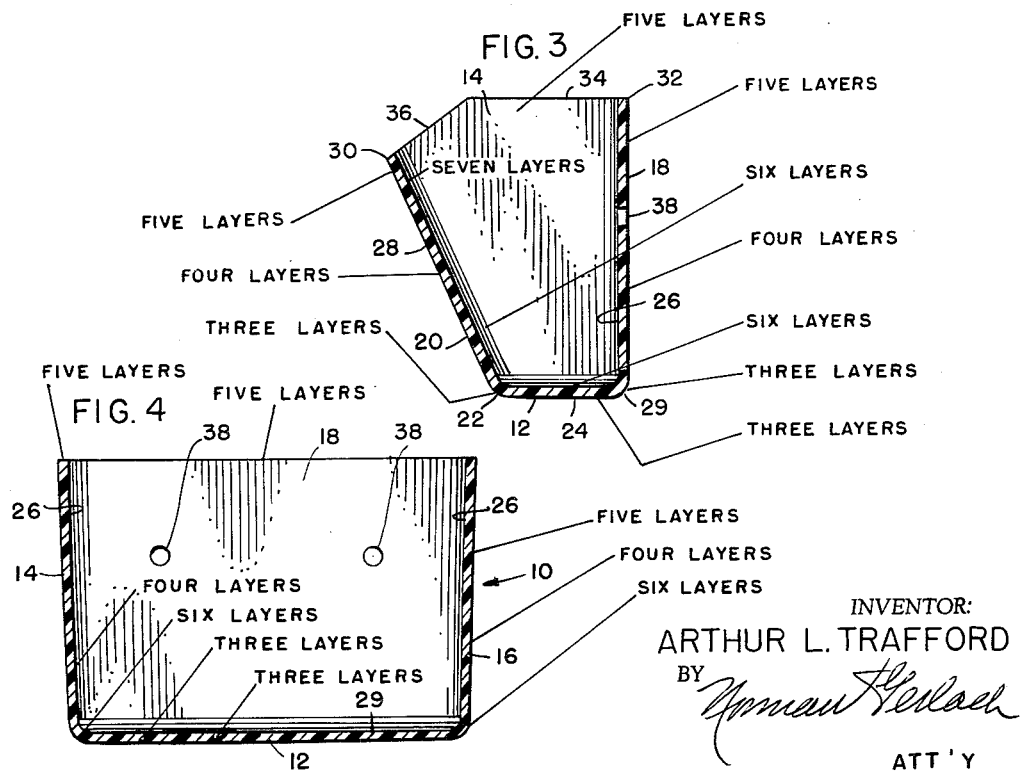

United States Patent Office 3,220,536
Patented Nov. 30, 1965

3,220,536
REINFORCED FIBERGLASS CONVEYOR
BUCKET
Arthur L. Trafford, Islington, Ontario, Canada, assignor to Webster Manufacturing, Inc., Tiffin, Ohio, a corporation of Ohio
Filed Oct. 17, 1962, Ser. No. 231,246
7 Claims. (Cl. 198—152)

The present invention relates generally to conveyor buckets and has particular reference to a novel reinforced fiberglass conveyor bucket which is designed for use in connection with a conveyor or elevator in the handling of a wide variety of bulk materials. The present application is specifically concerned with the construction of such a reinforced fiberglass conveyor bucket, while the method involved in fabricating the particular bucket constitutes the subject matter of my copending United States patent application Serial No. 231,250, filed on October 17, 1962, and entitled "Method of Fabricating Fiberglass-Reinforced Plastic Conveyor Buckets."

The improved conveyor bucket comprising the present invention has been designed for use primarily in connection wtih the handling of grains, feeds, and similar bulk materials by way of a centrifugal discharge-type conveyor or elevator and, accordingly, for exemplary purposes, a typical grain-type conveyor bucket has been illustrated and described herein. The principles of the invention are, however, applicable to other types of conveyor buckets, as, for example, buckets which are employed in the handling of starch, salt, fertilizers, sand, coal, abrasives, and a wide variety of other bulk materials too numerous to mention.

A comparative recent development in the manufacture of a conveyor or elevator bucket has been the production of a one-piece molded bucket in the form of a resinous phenol condensation product. Such a bucket possesses certain advantages over a conventional steel conveyor or elevator bucket and principal among these are its light weight, its non-corrosive nature or character, its smooth surface for ready discharge of the bulk material being handled, its static-free characteristics which completely eliminate the spark hazard, and its ability to resist wear, thus resulting in long life. Another important advantage of a molded plastic bucket resides in its ability to shatter when it comes into contact with an obstruction, whereas a steel or other metal bucket, under the same circumstances, will rip and jam the conveyor mechanism. An additional advantage offered by a molded plastic conveyor bucket is that magnetic materials are readily discharged from the non-ferrous plastic bucket, whereas a steel bucket retains such materials. While these advantages which accrue from the use of a molded plastic conveyor bucket are commendable, such a bucket is not altogether satisfactory in that its tensile and flexural strength leaves much to be desired. Efforts to improve such tensile and flexural strength by introducing cotton or paper fibers into the plastic material as a mix prior to the molding and curing operation have somewhat increased the overall strength of the bucket, but due to the heterogeneous distribution of the fibers throughout all portions of the bucket body, insufficient strength is offered to the body at locations where it is most needed, principally at the juncture regions between the side and end walls thereof and at the open rim regions of the bucket.

The improved conveyor bucket of the present invention is designed to overcome the aforementioned limitations that are attendant upon the construction and use of a conventional steel conveyor bucket, as well as upon the construction and use of a present-day molded plastic conveyor bucket, regardless of whether the bucket is of the fiber-impregnated type or otherwise. Briefly, a bucket which is constructed according to the principles of the present invention is reinforced in a predetermined manner and at judiciously selected strategic locations in the bucket body by glass fibers, certain of which are specifically oriented so as to extend substantially parallel to the plane of the open rim of the bucket, others of which are specifically oriented so as to extend substantially at right angles to the plane of the bucket rim, and still others of which extend in a heterogeneous fashion at varying angles, but all of which fibers extend parallel to the adjacent inside and outside surfaces of the bucket.

Field experience with a grain-type conveyor bucket thus reinforced with glass fibers according to the present invention, when conducted on a comparative basis with a steel conveyor bucket of identical size and configuration, has shown that the fiberglass reinforced bucket shows little signs of wear, whereas the steel bucket has its rim region worn to such a sharp edge as to be quite dangerous and warrant replacement of the steel bucket. Accidents occur when foreign material, such as steel bolts or pieces of chain, get into the grain to be conveyed or elevated, and a steel bucket, being rigid, is sometimes ripped out of shape as the result of encountering hard foreign elements thus causing fouling of the conveyor mechanism and resultant stoppage. A reinforced fiberglass conveyor bucket, being flexible, springs back into shape or small pieces of it break off, leaving it still operating without damage to the rest of the equipment or conveyor mechanism. The ability of a reinforced fiberglass conveyor bucket thus to flex continuously for long periods of time with high-speed frequency when in use, and with only occasional small-piece breakage, is not a characteristic of a conventional molded plastic conveyor bucket which is not reinforced by fiberglass in the manner of the present invention and has a tendency to shatter in its entirety or to break loose from its mounting on the associated conveyor belt.

Apart from advantages arising from actual use of a reinforced fiberglass conveyor bucket of the present invention, the flexural strength which is offered to the bucket by reinforcement in the rim regions thereof is sufficiently great that the usual transverse reinforcing struts which almost invariably are associated with a steel conveyor bucket bridge the rim of the bucket, may be omitted entirely. Thus, a large number of similar buckets embodying the present invention may be stacked together in telescopic fashion for shipment or for manual transportation by a workman from place to place. whereas with strut-reinforced steel conveyor buckets which cannot be stacked, no more than four such buckets may be carried by a workman at any one time. The lightness of the present reinforced fiberglass bucket also contributes in a large measure to facility of manual transportation since the weight of the steel bucket would prevent lifting of an appreciable number of steel buckets even if such buckets were capable of being nested or telescopically stacked.

A reinforced fiberglass bucket according to the present invention is not to be confused with a molded plastic bucket containing indiscriminately disposed fibers which are distributed throughout the bucket body by reason of their having been included in the initial or raw plastic mix. The last mentioned bucket takes on predominately the physical characteristics of the molded plastic, the intermixed embedded fibers in the plastic material offering little, if anything, to the inherently weak tensural and flexural strength of the finished molded bucket. A reinforced fiberglass bucket according to the present invention, on the other hand, takes on predominately the physical characteristics of the glass fibers which are associated therewith, and by reason of such fibers, great flexural and tensile strength is offered to all regions of the bucket body, particularly to the rim region thereof where repeated entry of the rim into and through the material being handled places the rim under high stress. Such flexural and tensile strength of the present conveyor bucket is the result of the specific arrangement of the glass fibers within the bucket body, these fibers being interwoven and interlaced in an efficient manner and being compressed together and bonded in such interlaced and interwoven condition as to oppose being pulled apart. In a conventional molded plastic bucket having fibers intermixed indiscriminately in the raw plastic material or mix, there is no such compression of fibers against each other and there is no directional strength afforded to the bucket body as in the case with a reinforced fiberglass bucket.

The novel distribution of glass fibers throughout the body of the present reinforced fiberglass bucket to lend increased flexural and tensile strength and the concentration of fibers in the rim and corner regions of the bucket body to lend reinforcement to these regions, as briefly outlined above, are largely the result of the particular method which is involved in fabricating the improved bucket. In this application, therefore, the method cannot be completely divorced from the description of the bucket per se. Reference may be had to my aforementioned copending patent application Serial No. 231,250 for a full understanding of the method, but for purposes of understanding the nature of the reinforced fiberglass conveyor bucket of the present inventiton, it may be stated briefly that the bucket is comprised of a series of sheet-like fiberglass patterns which are compressed together in layers or laminations to produce a composite whole, and the compressed patterns are impregnated with a thermosetting resin which, upon polymerization thereof, produces the finished bucket. The patterns are cut from prefabricated fiberglass sheet stock either mat or woven roving stock. Mat stock is comprised of glass fibers which, although extending in heterogeneous fashion in various directions, all lie in substantially the common plane of the sheet. Roving stock is comprised of interwoven warp and weft fibers, usually extending at right angles to each other. To incorporate the patterns in the bucket body, the patterns are impregnated with a suitable resinous material and are successively "draped," so to speak, upon a form having a shape characteristic conforming to the shape of the finished bucket to be formed. As each pattern is thus draped upon the form, it is compressed thereon and against any previously placed patterns so that, after the last pattern has been placed on the form, a composite pattern results. The form with the thus draped and impregnated and compressed patterns is then subjected to the action heat to induce polymerization, after which the finished bucket is stripped from the form. The various patterns are so designed that in applying them to the form as described above, certain of the patterns overlie certain other patterns in their entirety and still other patterns present overlapping edge regions in areas of the bucket which are to be predominately reinforced, for example, in the corner regions of the bucket. Over-all rim reinforcement is attained by utilizing so-called collar patterns which extend around the rim region of the bucket and remain in the finished bucket as a continuous encircling rim reinforcement. An additional type of reinforcement may be afforded to the finished bucket by establishing bulges in the individual patterns as they are draped upon the form and by creasing and folding these bulges over and against the form. In the illustrated and exemplary form of bucket, six patterns are employed. After they have been applied to the form according to the method of my aforesaid copending patent application to produce the composite patttern, and such pattern has been polymerized and removed from the form, the completed bucket will possess a fiberglass body consisting basically of three over-all fiberglass pattern layers or laminations; the four bucket side walls will be reinforced by an additional lamination throughout, making four laminations in all; the upstanding corner regions of the bucket at the junctures between the front wall and the two adjacent side walls will have, by reason of certain pattern overlap, two additional layers, making six layers in all; the upstanding corner regions at the junctures between the rear wall and the two adjacent side walls will have one additional layer, making five layers in these regions; the rim region of the four upstanding walls will be further reinforced by an additional layer, making five layers in each of the four parts of the rim region, making six layers at the junctures between the rear and side walls, and making seven layers at the junctures between the front and side walls; the corner juncture regions between the bottom wall and the side walls will, by reason of pattern overlap, have six layers; and limited portions of the front upstanding corner regions will, due to additional pattern fold and overlap, have a total of eight layers. The various layers or laminations are tightly compressed together and afford great reinforcing strength in the finished bucket body. The number of layers employed and the manner in which they are caused to overlap for reinforcing purposes may vary widely with different sizes and shapes of buckets, but in general, it is the upstanding corner regions and the rim region of any given bucket undergoing manufacture which will receive the additional pattern overlap reinforcement.

The provision of a conveyor bucket of the character briefly outlined above, and possessing the stated advantages, being the principal object of the present invention, numerous other objects and advantages not at this time enumerated will become readily apparent from a consideration of the following detailed description.

In the accompanying two sheets of drawings forming a part of this specification, a typical grain elevator bucket constructed according to the principles of the present invention has been illustrated and its method of construction schematically portrayed to the end that the physical nature of the bucket may be fully understood.

In these drawings:

FIG. 2 is a front perspective view of the improved reinforced fiberglass conveyor bucket, the nature of the reinforced areas of the bucket body being disclosed or made apparent by suitable labelling;

FIG. 3 is a sectional view similarly labelled and taken along the line 3—3 of FIG. 2; and FIG. 4 is a sectional view also labelled and taken along the line 4—4 of FIG. 2.

Figure 1:
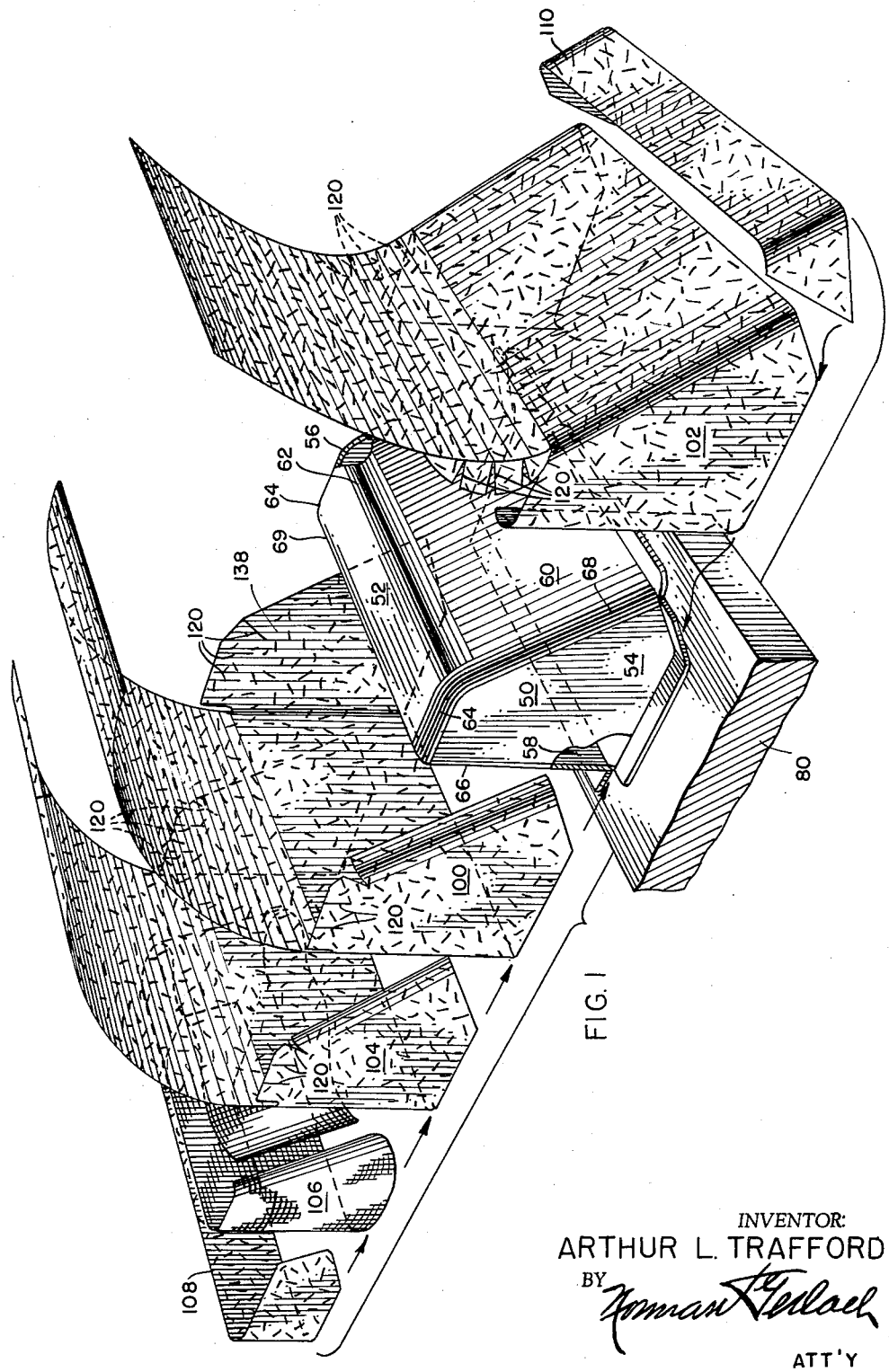
FIG. 1 is an exploded perspective view, entirely schematic in its representation, illustrating the manner in which a number of prefabricated resin-impregnated fiberglass patterns are applied to a conveyor bucket form or mold to produce a composite pattern which, when polymerized, constitutes the completed reinforced fiberglass conveyor bucket of the present invention.

Referring now to the drawings in detail and in particular to FIGS. 2, 3 and 4, there has been illustrated in these views a typical conveyor bucket of the grain elevator type, the illustration being purely exemplary of one form of bucket embodying the principles of the present invention. The particular bucket which has been selected for illustration herein is known in the grain trade as an elevator bucket of the heavy duty grain-type as distinguished from other grain-type buckets such as those known as medium-duty and light-duty buckets. As the designations imply, the designs of the various type buckets mentioned above are largely a matter of bucket weight as controlled by the amount of material employed in the fabrication of the buckets. Otherwise, the buckets have substantially the same configuration. The principles of the present invention are applicable to each of the aforementioned bucket styles as well as to buckets having uses other than in connection with the handling of grain, for example, buckets for the transportation or loading of sand, fertilizers, caustic bulk material, industrial chemical material in bulk form, abrasive materials, coal, coke, briquettes, and a wide variety of other substances too numerous to mention.

The bucket of FIGS. 2, 3 and 4 has been designated in its entirety by the reference numeral 10 and is conventional in its configuration in that it matches dimensionally the dimensions of a conventional steel conveyor bucket for the same purpose and service. As will be pointed out in greater detail presently, the bucket 10 is, in the main, formed of fiberglass which has been impregnated with a suitable polyester or other thermosetting resin and molded to bucket shape so that, after polymerization of the resinous material, the completed bucket is formed. As will also be described in detail subsequently, the resultant fiberglass bucket is reinforced in selected regions thereof by an excess of the fiberglass material. For the present, however, the shape characteristics of the bucket will first be described.

The bucket 10 is of deep cup-shape design and involves in its general organization a horizontal bottom wall 12 of relatively small proportions, approximately vertical side walls 14 and 16, a vertical back wall 18, and forwardly and upwardly inclined front wall 20. The various walls merge with one another at their regions of juncture by means of rounded edge and corner regions, the edge region 22 of juncture between the bottom wall 12 and inclined front wall 20 being curved on a relatively long radius. The juncture edge regions 24, 26 and 28 between the side walls 14 and 16 and the adjacent bottom, back and front walls 12, 18 and 20, respectively, are curved on a smaller radius, as also is the juncture edge region 29 between the bottom and back walls 12 and 18. The slant height of the front wall 20 is somewhat less than the vertical height of the back wall 18, and the maximum vertical height of the two side walls 14 and 16 is equal to the vertical height of the back wall 18. The upper edge 30 of the front wall 20 is straight and linear and extends in a horizontal plane; and so also is the upper edge 32 of the back wall 18. Such upper edge extends in a horizontal plane. The upper edge of each of the two side walls 14 or 16 is provided with a straight linear portion 34 which extends in the same horizontal plane as the plane of the edge 32, and is also provided with a forwardly and downwardly inclined straight linear edge portion 36 which joins the upper edge 30 of the front wall 20. Each side wall thus roughly has the outline of an irregular pentagon. The three upper edges 30, 36, 36 lie in a common plane which is inclined with respect to the horizontal plane of the three upper edges 32, 34, 34 so that for descriptive purposes, it may be said that the otherwise substantially regular scoop-shaped bucket 10 has its forward upper edge region truncated to modify or render irregular the otherwise rectangular open rim of the bucket. The back wall 18 may be provided with holes 38 in order to afford means whereby the bucket as a whole may be attached to an endless conveyor belt or the like in the usual manner of attachment of a conventional steel conveyor bucket.

According to the present invention, means are provided for internally reinforcing the body of the bucket 10 at what may be termed strategic locations, these locations, in general, being in addition to an over-all internal reinforcement of fibers, an added reinforcement in the curved juncture regions 24, 26 and 28, and an over-all fiberglass reinforcement of the front, back and side walls which increases progressively upwardly within these walls so that the bucket as a whole is predominantly reinforced in the upper portions or regions thereof.

Due to the difficulty in illustrating the fiberglass reinforcement of the bucket 10 from the draftsman's point of view, no attempt has been made herein to portray the specially reinforced areas or regions of the bucket in the cross-sectional views of FIGS. 3 and 4. The mode of such reinforcement and the magnitude thereof at the various locations within the body of the bucket are readily ascertainable by reference to FIG. 1 and to the labelling which has been applied to FIGS. 2, 3 and 4 when considered in connection with the following brief description of the method of bucket manufacture. It is this type of disclosure that is relied upon for an understanding of the nature of the bucket 10. The import of the above-mentioned labelling will be more readily understandable as the following description ensues.

According to the method, repetitive molding of successive buckets on an assembly-line basis may be effected, utilizing a base mold or pattern form such as has been illustrated in FIG. 1. This form has been designated in its entirety by the reference numeral 50 and is of inverted cup-shape design. It is fashioned from heavy gauge sheet steel so as to present an outside contour which is conformable to the inside contour of the particular bucket 10 which is to be molded thereupon. The outside surface of the form 50 is smooth, seamless and continuous, and to enhance its smoothness, the outside surface of the form is preferably chromeplated. Smoothness of the outside surface of the form is essential not only to facilitate stripping of the ultimately molded bucket from the form, but also to insure a smooth continuous inner surface in the completed bucket, thus enhancing proper centrifugal discharge of the load during use of the completed bucket.

The counterpart surfaces on the form 50 which correspond to the various bucket walls and juncture regions between walls are a substantially flat horizontal top wall 52 which corresponds to the bottom wall 12, substantially vertical side walls 54 and 56 which correspond to the side walls 14 and 16, respectively, a vertical back wall 58 which corresponds to the back wall 18, and an inclined front wall 60 which corresponds to the front wall 20 of the bucket 10. The form 50 also is provided with curved juncture regions between the various form walls, these juncture regions being designated by the reference numerals 62, 64, 66, 68 and 69, which correspond respectively to the curved edge regions 22, 24, 26, 28 and 29 of the bucket body.

The shape or contour of the lower open downwardly facing rim of the form 50 is also substantially conformable to the shape of the rim of the bucket 10 and this former rim is provided with a lateral or base flange, the various sections of which have been designated at 70, 72, 74 and 76 and correspond respectively to the rim edges 30, 32, 34 and 36 which have previously been described in connection with the rim region of the bucket 10. The base flanges 72, 74, 74 are coplanar and extend horizontally and are normal to the walls which they adjoin, while the base flanges 70 and 76 are inclined and extend normal to the walls which they adjoin. It will be understood that the form 50 constitutes the basis for various molding operations which are conducted according to the method and that when this form is positioned for such molding operations, it will be suitably supported upon a working table or other operating supporting structure, the form being possessed of stable equilibrium due to the wide reach of the three coplanar horizontal flanges 72, 74, 74.

Still referring to FIG. 1, the previously-described hollow form 50 is shown as being supported in its inverted position on a suitable working or operating table at a forming station, and a fragment of which has been shown at 80, preparatory to receiving thereon the various constituent fiberglass patterns which cooperate to make up the finished or completed conveyor bucket 10. These fiberglass patterns have been designated in their respective entireties by the reference numerals 100, 102, 104, 106, 108 and 110. They are, after impregnation with the thermosetting resin, adapted to be "draped," so to speak, about the outside surface of the form 50 serially and in the order named, as well as in overlapping relationship, each with the others, as well as with integral overlapping of portions of certain of the patterns, to produce the basic composite fiberglass reinforcing pattern in the finished product. Briefly, the method consists in applying the various resin-impregnated patterns to the form so as to cover or overlie selected areas of the form, thereby building up the body of the bucket preparatory to effecting polymerization of the built-up mass or body on the form. The only tools required by the operator at the forming station are a roller applicator and a pair of scissors or a sharp blade, such as a razor blade, to the end that the operator may, if he or she considers it necessary, effect minor trimming operations on the form to compensate for slight discrepancies in the cutting of the patterns.

The specific nature of the thermosetting resinous material may vary according to the requirements of the finished buckets and various types of resins are available for use. One polyester resin found suitable for use in connection with the formation of the bucket body is the resin sold by the Glidden Co., of Chicago, Illinois, under the trade name "Glidpol 12 VB57." Also, the nature of the fiberglass patterns 100, 102, 104, 106, 108 and 110 may vary in the production of different types of buckets, but in the production of the illustrated bucket 10, two types of patterns are contemplated. Patterns 100, 102, 104, 108 and 110 are cut from large sheets of fiberglass stock which is known as mat material and consists of a web having appreciable thickness in its free state and comprising a large number of nonwoven randomly interlaced fiberglass strands superimposed upon one another throughout the entire area of the web and extending in heterogeneous fashion in various directions but lying in respective planes which are parallel to the general plane of the mat material. The fibers are lightly bonded together by a suitable sizing material to enable the mat material to retain its body or shape, and the web is lightly compacted. The pattern 106 is cut from a large sheet of fiberglass stock known as woven roving stock. Such stock comprises groups of parallel extending glass fibers with the various groups being woven together in criss-cross fashion to provide warp and weft strand groups.

As is readily ascertainable from an inspection of FIG. 1, the three patterns 100, 102, and 104 are in the form of what will be termed full or base patterns in that they substantially completely envelop the form 50 when applied thereto. The other patterns, namely, 106, 108 and 110, are what will be termed partial patterns in that, when applied to the form 50, they envelop only selected areas of the form. The various patterns 100, 102, 104, 106, 108 and 110 are applied to the form 50 in the order named, and when so applied, the three full patterns 100, 102 and 104 become superimposed on the form coextensively to give an over-all form coverage consisting of three layers or laminations of the fiberglass mat material. Each of these three full patterns 100, 102 and 104 is generally of T-shape configuration in plan, the patterns 100 and 104 being identical and being similarly applied to the form, and the pattern 102 differing slightly in shape since it is draped upon the form in a reverse manner from the draping of the patterns 100 and 104. Reference may be had to my aforementioned copending application Serial No. 231,250 for a full understanding of the specific manner of draping the various patterns on the form 50, but for purposes of discussion herein, it is deemed sufficient to point out that each of the two patterns 100 and 104, when applied to the form 50, presents overlapping edge regions along the juncture regions 64 and 68 of the form, while the pattern 102, when applied to the form, presents overlapping edge regions along the juncture regions 64 and 66 of the form. Portions of these overlapping edge regions of the various patterns are slitted as at 120 to facilitate pattern overlap when applied to the form.

Considering now the effect of the successive application of the three patterns 100, 102 and 104 to the form 50, and with reference to the labelling of FIGS. 2, 3 and 4, it will be seen that these three patterns are responsible for an over-all three-layer fiberglass mat content in every region of the bucket body, for three additional layers along the juncture regions 24 and 28, and for one additional layer along the juncture regions 26.

The partial pattern 106 is in the form of a full height collar which is capable of encompassing the four upstanding walls of the form 50, and thus, its application to the form adds one additional fiberglass layer of woven roving material coextensively to each of the four upstanding walls 14, 16, 18 and 20 of the bucket 10.

The partial pattern 108 is in the form of a partial height collar and its application to the form adds a fifth layer to the back wall 18 in the rim region thereof, as well as contributing a layer to the juncture regions 26 near the rim of the bucket.

The partial pattern 110 also is in the form of a partial height collar and its application to the form adds a fifth layer to the front wall 20 in the rim region thereof, as well as contributing a layer to the juncture regions 28 near the rim of the bucket.

The labelling of FIGS. 2, 3 and 4 represents a summation of the above described layer additions and placements in the finished bucket 10, and numerically, as well as location-wise, the layers which are indicated by the labelling correspond to the number and location of layers in the built-up composite pattern on the form before it is polymerized and removed from the form 50.

As previously stated, due to the difficulty involved from a draftsman's point of view, no attempt has been made in FIGS. 3 and 4 to illustrate the various layers contributed to the bucket body by the various patterns which constitute the final composite pattern on the form 50. In actual practice, during application of these impregnated patterns in position on the form 50, the various patterns blend together so that, in appearance, no one pattern is distinguishable from the others. The entire composite assembly of patterns takes on an homogeneous appearance, and the fiberglass strands of which the patterns are composed lose their identity in the translucency of the entire mass. Stated otherwise, the various patterns, when suitably compressed against the form, become blended together into a substantially integral structure in which the glass fibers are hardly distinguishable and the visibility of the fibers is not restored even after polymerization has taken place in the final curing stage of the method of bucket fabrication.

As pointed out in my copending patent application, the bucket 10 of the present invention lends itself readily to assembly-line type production wherein one operator will attend to impregnating the various flat sheet patterns, while another operator will attend to placing the impregnated patterns upon the form and compressing them into position thereon by a roller-type tool (not shown). Due to the manual operations which are involved, the exact disposition of fiberglass patterns within the body of successively produced patterns will not obtain for each bucket. The individual patterns, during and after impregnation thereof, will shift their dimensions slightly one way or another, depending upon the directional pressure applied thereto during impregnation and applications to the form. Thus, the patterns will not always accurately fit the portions of the form for which they were intended. This contingency is remedied, however, inasmuch as the impregnating operation loosens the light bond originally existing between the various glass fibers in the manufacture of the mat stock sheet and allows the fibers in localized areas of the various patterns to be shifted within the plane of the pattern to make up for any discrepancy or offset or overlap in edges that are intended to meet each other or to register with linear portions of the form. The patterns may be stretched on the form in one direction or another to close a gap, hide a blemish, or otherwise conform the patterns to the contour of the form, but after the various patterns have been thoroughly worked on the form, uniformity of appearance will result.

In the application of any of the patterns to the form 50, it is possible to attain additional fiberglass reinforcement at any selected region of the finished bucket by bunching the material of the pattern in the corresponding region of the form, folding or creasing the bunched material and then bending it over flat on the form, after which it may be compressed thereon so as to blend with the previously-applied patterns. This expedient may be used to attain increased reinforcement along any of the juncture regions between the upstanding side walls of the bucket, for example, along the regions 28.

It is to be particularly noted that although the labelling of FIGS. 2, 3 and 4 indicates that the various walls of the bucket 10 vary in layer concentration between a minimum of three fiberglass layers for the bottom wall 12 and juncture regions 22 and 29, and a maximum of seven layers in the juncture regions 28 near the rim of the bucket (or eight layers if the previously-described bunching of material is resorted to in these regions), the apparent thickness of the bucket walls is not increased by the additional layers, and the bucket body takes on a smooth and uniform appearance throughout, the body being translucent and the disposition of glass fibers therein being indistinguishable.

A conveyor bucket as described herein and made according to the method of my application Serial No. 231,250, will withstand tremendous compressional and tensional forces and has comparatively great flexural strength in the various upstanding walls thereof. The walls of such a bucket, and especially the rim regions of the front wall 20 and juncture regions 28 are subjected to high frequency vibrational effects when the buckets are in actual use, for example, on a marine leg grain elevator. Field experience has shown that the bucket walls are capable of withstanding such high frequency vibration indefinitely. Furthermore, whereas a steel conveyor bucket of similar design wears rapidly to a sharp edge around the rim region of the bucket, a reinforced fiberglass bucket constructed according to the present invention will retain its blunt rim edge indefinitely, thus eliminating the usual handling hazard.

The invention is not to be limited to the exact arrangement of parts shown in the accompanying drawings or described in this specification as various changes in the details of construction of the bucket may be resorted to without departing from the spirit of the invention. For example, the specific design of the various patterns 100, 102, 104, 108 and 110 may be varied to accommodate buckets having different shapes or to effect different fiberglass reinforcement in selected regions of the bucket body. Also the order of application of the patterns to the form 50 may be varied so that the order of pattern layers or laminations in the completed bucket body will be different. In general, with any design of bucket, the object will be to provide an excess of glass fibers in the various juncture regions between adjacent walls and in the rim region of the bucket. The use of at least one full height collar-type pattern of woven roving will usually be resorted to give high tensile characteristics to the bucket walls at such times as outward thrust is applied to these walls from within the bucket interior. Therefore, only insofar as the invention has particularly been pointed out in the accompanying claims is the same to be limited.

Having thus described the invention, what I claim as new and desire to secure by Letters Patent is:

1. A one-piece elevator bucket having a horizontal bottom wall, upstanding front and rear walls, and a pair of oppositely disposed upstanding side walls, said upstanding walls defining a generally rectangular open bucket rim, the juncture region between each pair of adjacent walls being curved on a comparatively small radius, said bucket consisting of two similar nested fiberglass sheet patterns of interlaced fibers which extend in the general plane of the sheet, said patterns being folded to the shape of the bucket to produce all of said walls, one of said patterns having overlapping edge regions lying within the juncture regions between said front wall and the adjacent side walls, the other pattern having overlapping edge regions lying within the juncture regions between said rear wall and the adjacent side walls, said patterns being compressed together and impregnated with a polymerized resin by means of which the patterns are caused to hold their shapes.

2. A one-piece elevator bucket having a horizontal bottom wall, upstanding side walls, an upstanding rear wall, and an upstanding forwardly and upwardly inclined front wall, said upstanding walls defining a generally rectangular open bucket rim, the juncture region between each pair of adjacent walls being curved on a comparatively small radius, said bucket consisting of two similar nested fiberglass base patterns of interlaced fibers extending in heterogeneous fashion in the general planes of the patterns, said patterns being folded to the shape of the bucket to produce pattern sections coextensive with each of said walls respectively, one of said patterns having overlapping edge regions lying within the juncture regions between said front wall and the adjacent side walls, the other pattern having overlapping edge relations lying within the juncture regions between said rear wall and the adjacent side walls, and a third full height fiberglass collar pattern consisting of interlaced fibers extending in the general plane of the pattern, said collar pattern being folded to produce pattern sections coextensive with each of said upstanding walls respectively, the three patterns being compressed together and impregnated with a polymerized resin by means of which the patterns are caused to hold their shapes.

3. A one-piece elevator bucket having a horizontal bottom wall, upstanding side walls, an upstanding rear wall, and an upstanding forwardly and upwardly inclined front wall, said upstanding walls defining a generally rectangular open bucket rim, the juncture region between each pair of adjacent walls being curved on a comparatively small radius, said bucket consisting of a first fiberglass base pattern of interlaced fibers extending in heterogeneous fashion in the general plane of the pattern, said pattern being folded to the shape of the bucket to produce pattern sections coextensive with each of said walls respectively, said pattern having overlapping edge regions lying within the juncture regions between said front wall and the adjacent side walls, a second and similar fiberglass base pattern, similarly folded but reversely positioned, and having overlapping edge regions lying within the juncture regions between said rear wall and the adjacent side walls, a third and partial height fiberglass collar pattern of interlaced fibers extending in heterogeneous fashion in the general plane of the third pattern, said collar pattern extending along the rim region of the bucket front wall and having its end regions folded around the juncture regions between said front wall and the side walls, a fourth and partial height fiberglass collar pattern of interlaced fibers extending in heterogeneous fashion in the general plane of the fourth pattern, said fourth pattern extending along the rim region of the bucket rear wall and having its end regions folded around the juncture regions between said rear wall and the side walls, the four patterns being compressed together and impregnated with a polymerized resin by means of which the patterns are caused to hold their folded shapes.

4. A one-piece elevator bucket having a horizontal bottom wall, upstanding side walls, an upstanding rear wall, and an upstanding forwardly and upwardly inclined front wall, said upstanding walls defining a generally rectangular rim, the juncture regions between each pair of adjacent walls being curved on a comparatively small radius, said bucket consisting of two similar nested base patterns formed of fiberglass mat stock and folded to the shape of the bucket to produce in substance said bucket walls, one of said patterns having overlapping edge regions lying within the juncture regions between said front wall and the adjacent side walls, the other pattern having overlapping edge regions lying within the juncture regions between said rear wall and the adjacent side walls, and a side-reinforcing collar pattern formed of woven roving fiberglass stock and folded about and coextensive with the portions of the base patterns which in substance produce the upstanding walls, and a rim-reinforcing collar pattern formed of fiberglass mat stock and folded about the rim regions of portions of the side-reinforcing collar pattern which, in turn, are folded about the portions of the base patterns which, in substance, produce the front and side walls, all of said patterns being compressed together to produce a composite pattern and being impregnated with a polymerized resin by means of which the composite pattern is caused to hold its shape, said rim-reinforcing collar pattern which is formed of woven roving fiberglass stock presenting strand groups which extend parallel to the rim of the bucket.

5. A one-piece elevator bucket having a horizontal bottom wall, upstanding side walls, an upstanding rear wall, and a forwardly and upwardly inclined front wall, said upstanding walls defining a generally rectangular open rim, the juncture regions between each pair of adjacent walls being curved on a comparatively small radius, said bucket consisting of a plurality of nested fiberglass patterns, at least one of which is formed of woven roving stock and others of which are formed of mat stock, said patterns being compressed together to produce a composite pattern and being impregnated with a polymerized polyester resin by means of which the composite pattern is caused to hold its shape, such patterns as are formed of woven roving stock having fiber groups which extend parallel to the open rim of the bucket.

6. A one-piece elevator bucket having a horizontal bottom wall, upstanding side walls, an upstanding rear wall, and an upstanding forwardly and upwardly inclined front wall, said upstanding walls defining a generally rectangular open bucket rim, the juncture regions between each pair of adjacent walls being curved on a comparatively small radius, said bucket consisting of two similar nested fiberglass base patterns of interlaced fibers extending in heterogeneous fashion in the general planes of the patterns, the patterns being generally of T-shape design in plan and presenting a stem part with lateral side wing parts, said patterns being folded to the shape of the bucket to produce pattern sections coextensive with all of said walls, said patterns being reversely disposed with the stem parts thereof lying within the front, bottom and rear walls, and with the side wing parts lying within the side walls, the side edge regions of each stem part overlapping the adjacent edge regions of the associated side wing parts and lying within the curved juncture regions which exist between the bottom wall and the side walls, as well as within the curved juncture regions which exist between the side walls and the adjacent upstanding walls, the two patterns being compressed together and impregnated with a polymerized resin by means of which the patterns are caused to hold their shape.

7. A one-piece elevator bucket as set forth in claim 6 and including, additionally, a full height collar pattern consisting of interlaced fibers extending in the general plane of the collar pattern, said collar pattern being folded to produce pattern sections coextensive with each of said upstanding walls, respectively, the collar pattern being compressed and impregnated together with the two base patterns.

References Cited by the Examiner
UNITED STATES PATENTS

| | | | |
|---|---|---|---|
| 587,697 | 8/1897 | Brash | 198—152 |
| 1,008,995 | 11/1911 | St. Clair | 198—141 |
| 2,311,613 | 2/1943 | Slayter. | |
| 2,370,531 | 2/1945 | Gemeny | 198—152 |

SAMUEL F. COLEMAN, *Primary Examiner.*

WILLIAM B. LA BORDE, *Examiner.*